United States Patent [19]

Thayer

[11] Patent Number: 5,170,658

[45] Date of Patent: Dec. 15, 1992

[54] BICYCLE TIRE LEAK DETECTOR APPARATUS

[76] Inventor: Thomas J. Thayer, 699 Vulcan, Encinitas, Calif. 92024

[21] Appl. No.: 647,275

[22] Filed: Jan. 28, 1991

[51] Int. Cl.⁵ .................. G01M 3/06; G01M 3/08; B62J 9/00
[52] U.S. Cl. .................... 73/45.6; 73/45.5; 73/49; 224/30 R
[58] Field of Search ........... 73/40, 45.5, 45.6; 280/288.4, 304.5, 201, 202; 224/37; 137/231; 141/38; D7/620; D12/114, 111

[56] References Cited

U.S. PATENT DOCUMENTS

| | | | |
|---|---|---|---|
| Re. 20,502 | 9/1937 | Lookholder | 73/45.6 |
| D. 316,389 | 4/1991 | Wood et al. | D12/114 |
| 1,071,124 | 8/1913 | Whitney | 73/45.6 |
| 1,273,914 | 7/1918 | O'Sullivan | 73/45.6 |
| 1,827,232 | 10/1931 | Henry | 73/45.6 |
| 2,076,037 | 4/1937 | Lookholder | 73/45.6 |
| 2,290,975 | 7/1942 | Laursen | 73/45.6 |
| 2,549,222 | 4/1951 | Moebes | 73/45.6 |

*Primary Examiner*—Hezron E. Williams
*Assistant Examiner*—George M. Dombroske
*Attorney, Agent, or Firm*—Stetina and Brunda

[57] ABSTRACT

The present invention relates to a portable bicycle tire leak detector apparatus which is adapted to be attachable to a bicycle frame or conventional bicycle tire pump. The apparatus generally comprises a water bottle having a trough member releasably mounted thereto. The trough member is adapted to contain a quantity of water in a manner allowing an inner-tube of a bicycle tire to be submerged therewithin. The apparatus further includes bicycle tire repair elements which may be stored within the trough member when not filled with water.

12 Claims, 2 Drawing Sheets

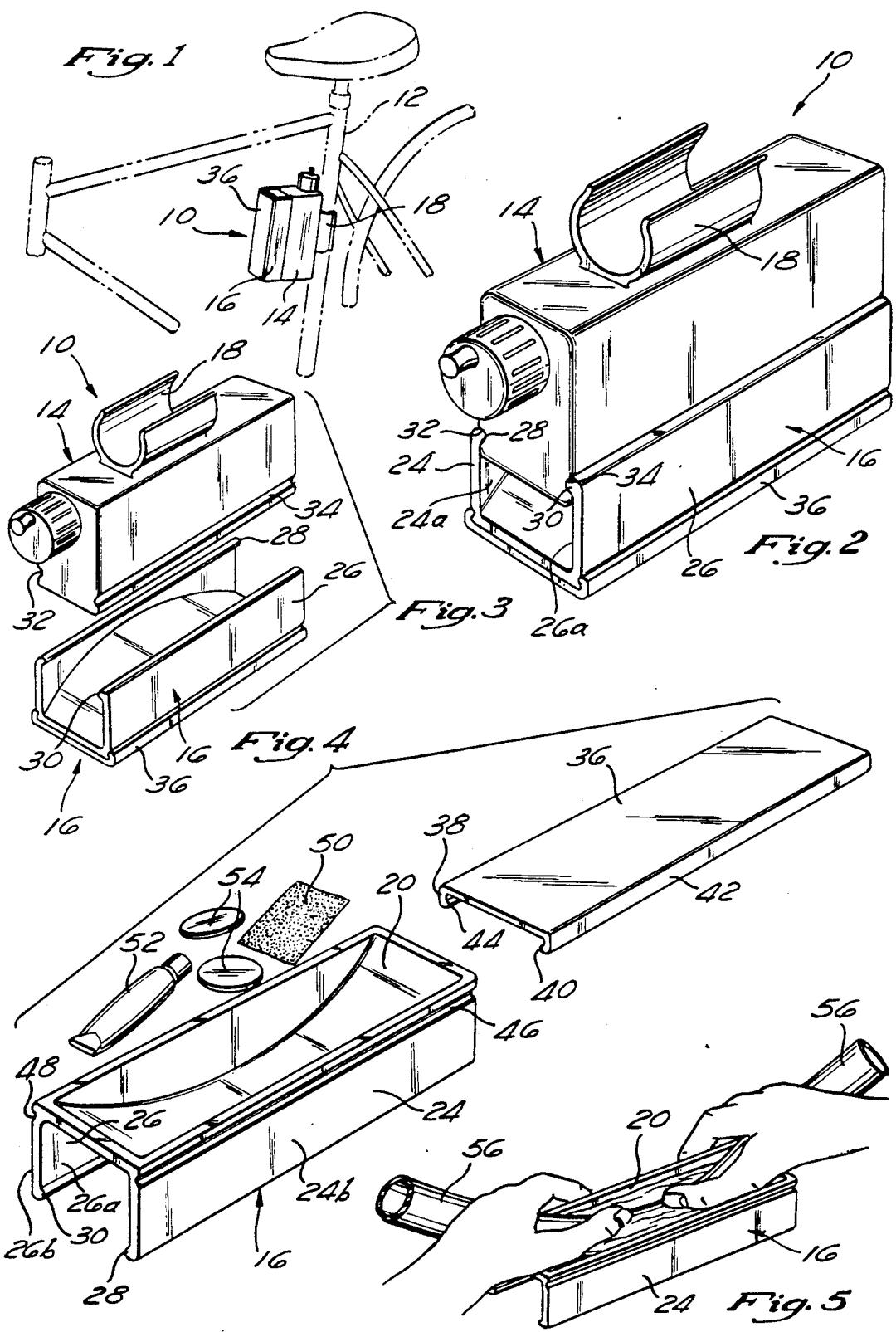

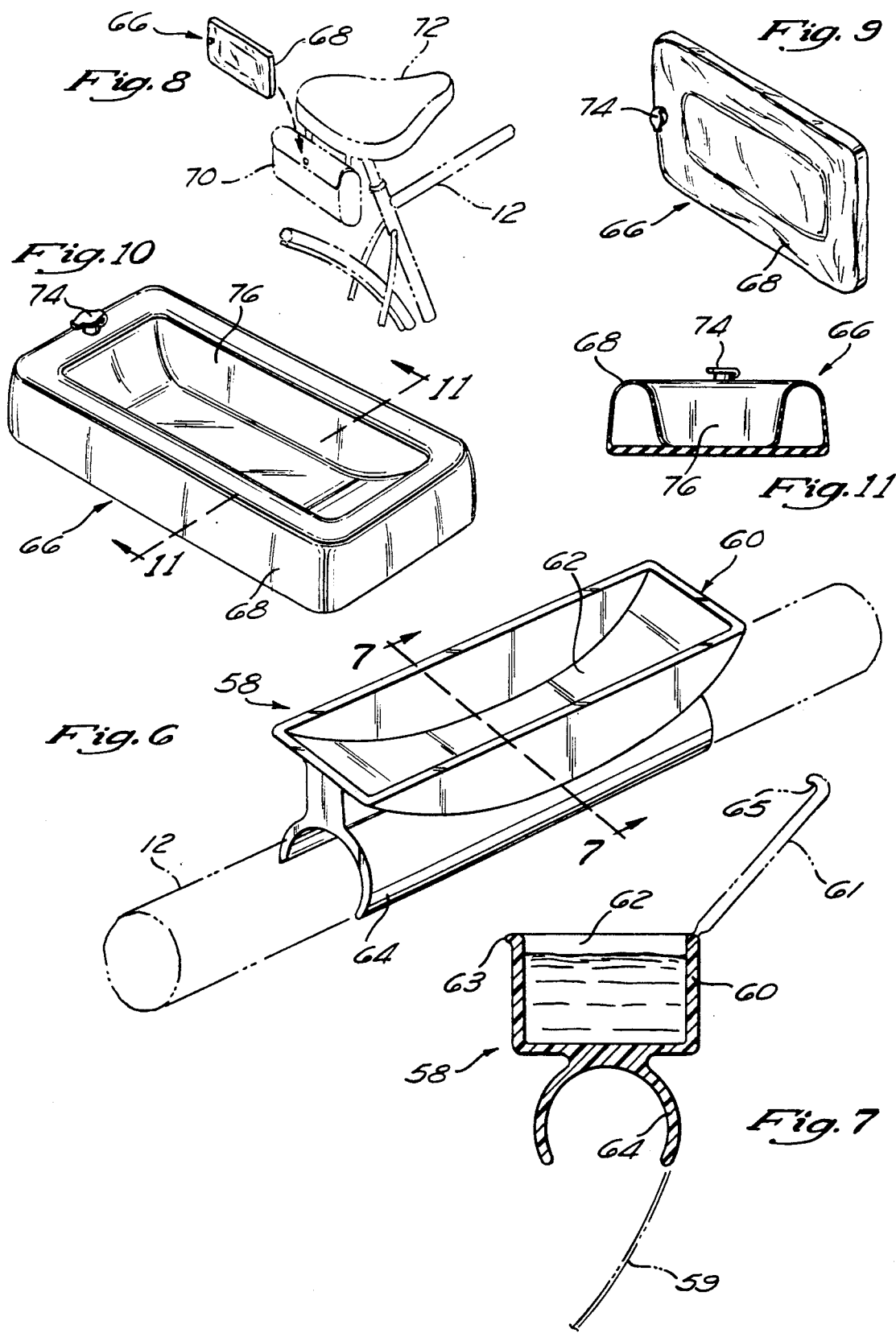

BICYCLE TIRE LEAK DETECTOR APPARATUS

FIELD OF THE INVENTION

The present invention relates generally to leak detection equipment, and more particularly to a portable leak detector which may be mounted to a bicycle and utilized for locating air leaks in bicycle tires.

BACKGROUND OF THE INVENTION

A well known method of locating leaks in bicycle tires involves removing the inner-tube from the bicycle tire and submerging the inner-tube in a water filled sink or basin. In this regard, the observance of air bubbles emanating from the inner-tube provides a visual indication as to the location of the puncture or leak within the inner-tube. After the leak has been located, the inner-tube is generally repaired by roughing the surface of the inner-tube about the puncture with a piece of sand paper and subsequently applying a patch over the puncture by means of an adhesive. Although the aforementioned repair technique is well suited for repairing bicycle tire leaks, oftentimes flat bicycle tires occur in locations where the bicycle rider has no access to a water filled sink or basin. Thus, there exists a need in the art for a device for locating air leaks in bicycle tires, wherein the device may be easily transported with the bicycle.

SUMMARY OF THE INVENTION

In accordance with preferred embodiments of the present invention, there is provided a portable device for locating air leaks in bicycle tires. In a first embodiment of the present invention, the air leak detection device generally comprises the combination of an elongate trough member and a water bottle. The trough member which defines a water retaining recess having a generally concave configuration, includes first and second rail members which are adapted to be releasably mountable to the water bottle. The water retaining recess is adapted to retain water at a sufficient depth wherein at least a portion of the inner-tube of the bicycle tire may be completely submerged therewithin.

The trough member also includes a lid member positionable in open and closed positions, the lid member being slidably attachable to the trough member in a manner wherein the lid member encloses the water retaining recess when in the closed position. In this respect, when the water retaining recess of the trough member is not being used for purposes of detecting an air leak, tire repair elements such as sand paper, adhesive, and patches may be stored therein when the lid member is in the closed position. The water bottle itself includes a semi-circular portion which is adapted to be press fit onto a segment of a bicycle frame or onto a conventional bicycle tire pump already attached to the bicycle frame.

In accordance with a second embodiment of the present invention, the air leak detection device generally comprises only an elongate trough member. In this respect, as with the first embodiment, the trough member defines a generally concave water retaining recess which is adapted to retain water at a depth so as to allow at least a portion of the inner-tube of the bicycle tire to be submerged therewithin. The trough member is constructed to include a semi-circular portion as an alternative to the first and second rail members included with the first embodiment. Similar to the semi-circular portion of the water bottle included with the first embodiment, the semi-circular portion of the trough member of the second embodiment is likewise adapted to be press fit onto a bicycle frame or onto a conventional bicycle tire pump. Additionally, the trough member constructed in accordance with the second embodiment may also include a lid member which operates in the same manner and for the same purposes as previously described with respect to the first embodiment.

In accordance with a third embodiment of the present invention, the air leak detection device generally comprises an elongate, inflatable trough member. As with the first and second embodiments, the trough member, when inflated, defines a generally concave water retaining recess which is adapted to retain water at a depth so as to allow at least a portion of the inner-tube of the bicycle tube of the bicycle tire to be submerged therewithin. When in its deflated state, the trough member is adapted to be stored within a carrying case which is attachable to a seat or frame portion of the bicycle.

It is an object of the present invention to provide a bicycle tire leak detection device wherein the device is portable and may be attached to a bicycle frame or a conventional bicycle tire pump.

Another object of the present invention is to provide a bicycle tire leak detection device wherein the device is adapted to store bicycle tire repair elements.

Another object of the present invention is to provide a bicycle tire leak detection device which includes a water supply source.

BRIEF DESCRIPTION OF THE DRAWINGS

These as well as other features of the present invention will become more apparent upon reference to the drawings wherein:

FIG. 1 is a perspective view of a bicycle tire leak detector apparatus constructed in accordance with a first embodiment of the present invention as attached to the frame of a bicycle (shown in phantom);

FIG. 2 is a perspective view of the bicycle tire leak detector constructed in accordance with the first embodiment;

FIG. 3 is a perspective view illustrating the water bottle and trough member components of the first embodiment in a separated orientation;

FIG. 4 is a perspective view of the trough member of the first embodiment, further illustrating the lid member and tire repair elements included therewith;

FIG. 5 is a perspective view illustrating the manner in which an inner-tube of a bicycle tire is submerged within the water retaining recess of the trough member;

FIG. 6 is a perspective view of a bicycle tire leak detector constructed in accordance with a second embodiment of the present invention, illustrating the manner in which the device is attached to the frame portion of a bicycle (shown in phantom);

FIG. 7 is a cross-sectional view taken along lines 7—7 of FIG. 6;

FIG. 8 is a perspective view of a bicycle tire leak detector apparatus constructed in accordance with a third embodiment of the present invention illustrating the manner in which the third embodiment is stored upon a bicycle (shown in phantom);

FIG. 9 is a perspective view of the third embodiment in its deflated state;

FIG. 10 is a perspective view of the third embodiment in its inflated state; and FIG. 11 is a cross sectional view taken along line 11—11 of FIG. 10.

DETAILED DESCRIPTION OF THE PREFERRED EMBODIMENTS

Referring now to the drawings where the showings are for purposes of illustrating preferred embodiments of the present invention and not for purposes of limiting same, FIG. 1 perspectively illustrates a bicycle tire leak detector assembly 10 constructed in accordance with a first embodiment of the present invention. As shown in FIG. 1, leak detector assembly 10 is connected to a segment of a bicycle frame 12.

Referring now to FIGS. 2 and 3, leak detector assembly 10 generally comprises a water bottle 14 and a trough member 16. Attached to one side of water bottle 14 is a semi-circular member 18. Semi-circular member 18 is adapted to be press fit onto a structure having a generally cylindrical configuration such as the bicycle frame 12 (as seen in FIG. 1) or a conventional bicycle tire pump (not shown) which may be already attached to bicycle frame 12. Trough member 16 defines a water retaining recess 20 which preferably has a generally concave configuration. In the first embodiment, trough member 16 further includes a first rail 24 and a second rail 26 which are used to releasably mount trough member 16 to water bottle 14 in the manner shown in FIG. 2. In this respect, formed on the inner surface 24a of first rail 24 is a first rib 28 while formed on the inner surface 26a of second rail 26 is a second rib 30. Additionally, formed within opposed sides of water bottle 14 are a first elongate slot 32 and a second elongate slot 34. To facilitate the attachment of water bottle 14 to trough member 16, first slot 32 is adapted to slidably receive first rib 28, while second slot 34 is adapted to slidably receive second rib 30. Importantly, first rib 28 and second rib 30 are identically sized and configured, as are first slot 32 and second slot 34. Thus, first rib 28 may also be slidably received into second slot 34 and second rib 30 slidably received into first slot 34 in mounting water bottle 14 to trough member 16.

As best seen in FIG. 4, trough member 16 further comprises a lid member 36 which is positionable in an open position and a closed position. In the first embodiment, lid member 36 is slidably receivable onto trough member 16 in a manner operable to enclose recess 20. In this respect, lid member 36 includes a first flange 38 having a first lip 40 formed thereon, and a second flange 42 having a second lip 44 formed thereon. Disposed within outer surface 24b of first rail 24 is a first elongate channel 46, while disposed in outer surface 26b of second rail 26 is a second elongate channel 48. To facilitate the attachment of lid member 36 to trough member 16, first channel 46 is adapted to slidably receive first lip 40 while second channel 48 is adapted to slidably receive second lip 44. Importantly, first lip 40 and second lip 44 are identically sized and configured as are first channel 46 and second channel 48. Thus, first lip 40 may also be received into second channel 48 and second lip 44 may be received into first channel 46 in attaching lid member 36 to trough member 16. Though lid member 36 has been described as being slidably received onto trough member 16, it will be appreciated that other devices such as one or more hinges may be used as alternatives to lips 40, 44 and channels 46, 48 as previously described. When leak detector assembly 10 is not being used to detect air leaks, numerous tire repairing elements (as seen in FIG. 4) such as sand paper 50, adhesive 52 and patches 54 may be stored within water retaining recess 20 by placing lid member 36 into the closed position as shown in FIGS. 1-3.

In utilizing leak detector assembly 10, water bottle 14 is removed from the bicycle frame 14 or tire pump and trough member 16 is slidably removed from water bottle 14. Lid member 36 is then removed from trough member 16 as shown in FIG. 4 and the tire repair elements emptied from within recess 20. Water from water bottle 14 or an alternative source is then poured into water retaining recess 20. As best seen in FIG. 5, air leaks within a bicycle tire inner-tube 56 are located by submerging inner-tube 56 within the water retained within recess 20 and looking for bubbles emanating from inner-tube 56. After the leak within inner-tube 56 has been located and repaired using the tire repair elements, the water is drained from recess 20 and the tire repair elements once again stored therewithin by reattaching lid member 36 to trough member 16. Trough member is then reattached to water bottle 14 and water bottle 14 is reattached to the bicycle frame 12 or the tire pump.

Referring now to FIGS. 6 and 7, illustrated is a leak detector device 58 constructed in accordance with a second embodiment of the present invention. Leak detector 58 generally comprises a trough member 60 which defines a generally concave water retaining recess 62 therein, and further includes a lower semi-circular portion 64. As with the semi-circular member 18 as previously described with respect to the first embodiment, semi-circular portion 64 is likewise adapted to be press fit onto a cylindrical section of bicycle frame 12 or a conventional bicycle tire pump. As seen in FIG. 7, semi-circular portion 64 may include a strap member 59 (shown in phantom) connected thereto which is extendable about a cylindrical section of bicycle frame 12 and operable to further aid in securing leak detector 58 to bicycle frame 12. Though not shown, semi-circular member 18 of the first embodiment may also include such a strap member. As also seen in FIG. 7, leak detector device 58 may be provided with a lid member 61 (shown in phantom) which is attached to trough member 60 by at least one hinge. Lid member 61 is adapted to be movable between an open position as shown and a closed position. In this regard, lid member 61 is maintained in the closed position by the receipt of an extension 63 formed upon trough member 60 into a groove 65 formed within lid member 61. As with the first embodiment, numerous tire repair elements may be stored within recess 62 when lid member 61 is in the closed position. It will be appreciated that trough member 16 of the first embodiment may be provided with a lid member in the manner as described with respect to the second embodiment, while trough member 60 of the second embodiment may be provided with a lid member in the manner as described with respect to the first embodiment.

In utilizing leak detector device 58, water is filled into recess 62 to a level as shown in FIG. 7. The bicycle inner-tube 56 is then submerged within the water retained within recess 62 in substantially the same manner as shown in FIG. 5. Trough member 60 of leak detector device 58 as well as trough member 16 of leak detector assembly 10 are each preferably constructed from plastic, though it will be appreciated that other materials may be utilized as an alternative.

Referring now to FIGS. 8-11, illustrated is a leak detector device 66 constructed in accordance with a third embodiment of the present invention. Leak detector 66 generally comprises an inflatable trough member 68. When trough member 68 is deflated (as seen in FIG. 9) trough member 68 is adapted to be stored within a carrying case 70 which is attachable to seat portion 72 of a bicycle or to the bicycle frame 12 as seen in FIG. 8. Trough member 68 is inflated through the use of a valve member 74 disposed therein. When trough member 68 is inflated (as shown in FIGS. 10 and 11), trough member 68 defines a generally concave water retaining recess 76 therein. As with the first and second embodiments, in utilizing leak detector device 66, water is filled into recess 76 to a level wherein a bicycle inner-tube may be submerged therein in substantially the same manner as shown in FIG. 5. Though not shown, various tire repair elements may also be stored within carrying case 70 in addition to the deflated trough member 68.

Additional modifications and improvements of the present invention may also be apparent to those skilled in the art. Thus, the particular combination of parts described and illustrated herein is intended to represent only one embodiment of the invention, it is not intended to serve as limitations of alternative devices within the spirit and scope of the invention.

What is claimed is:

1. A portable device for locating air leaks in bicycle tires comprising the combination of:
    a water bottle, said water bottle including a semi-circular portion sized and configured to be press fit onto a cylindrical object such as a portion of a bicycle frame; and
    an elongate trough member having an upper water retaining portion and a lower water bottle receiving portion, said bottle receiving portion being slideably receivable onto said water bottle;
    said bottle receiving portion comprising a first rail having a first rib formed thereon and a second rail having a second rib formed thereon and said water bottle including a first elongate slot and a second elongate slot disposed within opposed sides thereof, said first slot being adapted to slideably receive said first rib and said second slot being adapted to slideably receive said second rib.

2. The device of claim 1 wherein said trough member comprises a lid member positionable in an open position and a closed position, said lid member being attached to said trough member in a manner wherein said lid member covers said water retaining portion of said trough member when in said closed position.

3. The device of claim 2 further comprising tire repair elements, said tire repair elements being stored within said water retaining portion of said trough member when said lid member is in said position.

4. The device of claim 3 wherein said lid member is slidably receivable onto said water retaining portion of said trough member.

5. The device of claim 4 wherein said lid member includes a first flange having a first lip formed thereon and a second flange having a second lip formed thereon and said water retaining portion of said trough member includes a first elongate channel and a second elongate channel disposed within opposed sides thereof, said first channel being adapted to slidably receive said first lip and said second channel being adapted to slidably receive said second lip.

6. The device of claim 3 wherein said lid member is attached to said water retaining portion of said trough member by at least one hinge.

7. The device of claim 1 wherein said water retaining portion of said trough member comprises a recess having a generally concave configuration.

8. A portable device for locating air leaks in bicycle tires comprising an elongate trough member having an upper water retaining portion and a lower semi-circular portion sized and configured to be press fit onto a cylindrical object such as a portion of a bicycle frame, said trough member further comprising a lid member positionable in an open position and a closed position, said lid member being attached to said trough member in a manner wherein said lid member covers said water retaining portion of said trough member when in said closed position.

9. The device of claim 8 further comprising tire repair elements, said tire repair elements being stored within said water retaining portion of said trough member when said lid member is in said closed position.

10. The device of claim 9 wherein said lid member is slidably receivable onto said water retaining portion of said trough member.

11. The device of claim 9 wherein said lid member is attached to said water retaining portion of said trough member by at least one hinge.

12. The device of claim 8 wherein said water retaining portion of said trough member comprises a recess having a generally concave configuration.

* * * * *